(12) United States Patent
Wang et al.

(10) Patent No.: US 7,961,880 B2
(45) Date of Patent: Jun. 14, 2011

(54) METHODS AND APPARATUSES FOR DETERMINING SCRAMBLING CODES FOR SIGNAL TRANSMISSION

(75) Inventors: Judith Wang, Irvine, CA (US);
Guangcai Zhou, Agoura Hills, CA (US);
Joseph Santoru, Agoura Hills, CA (US);
Ernest C. Chen, San Pedro, CA (US);
Shamik Maitra, Redondo Beach, CA (US); Dennis Lai, Cerritos, CA (US);
Tung-Sheng Lin, Claremont, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 955 days.

(21) Appl. No.: 11/510,244

(22) Filed: Aug. 25, 2006

(65) Prior Publication Data

US 2007/0074242 A1    Mar. 29, 2007

(51) Int. Cl.
*H04N 7/167* (2011.01)
*H04B 1/00* (2006.01)
*H03D 1/04* (2006.01)
(52) U.S. Cl. .......................... 380/205; 375/148; 375/346
(58) Field of Classification Search .................. 380/205; 375/148, 346
See application file for complete search history.

(56) References Cited

U.S. PATENT DOCUMENTS

| | | | |
|---|---|---|---|
| 5,305,384 A | 4/1994 | Ashby et al. | |
| 5,377,183 A | 12/1994 | Dent | |
| 5,452,328 A * | 9/1995 | Rice | 375/142 |
| 5,673,260 A | 9/1997 | Umeda et al. | |
| 5,710,797 A | 1/1998 | Segal et al. | |
| 5,745,187 A * | 4/1998 | Hulyalkar et al. | 348/607 |
| 5,793,871 A * | 8/1998 | Jackson | 380/54 |
| 5,825,889 A | 10/1998 | Dent | |
| 6,069,883 A * | 5/2000 | Ejzak et al. | 370/335 |
| 6,088,324 A | 7/2000 | Sato | |
| 6,091,936 A | 7/2000 | Chennakeshu et al. | |
| 6,144,711 A | 11/2000 | Raleigh et al. | |
| 6,154,454 A | 11/2000 | Abe | |
| 6,163,533 A | 12/2000 | Esmailzadeh et al. | |
| 6,201,499 B1 | 3/2001 | Hawkes et al. | |
| 6,201,798 B1 | 3/2001 | Campanella et al. | |
| 6,324,159 B1 | 11/2001 | Mennekens et al. | |
| 6,400,761 B1 | 6/2002 | Smee et al. | |

(Continued)

FOREIGN PATENT DOCUMENTS

CN    1 728 622    2/2006

(Continued)

OTHER PUBLICATIONS

EPO Communication dated Sep. 10, 2009 in European patent application No. 06789990.6 filed Aug. 25, 2006 by Judith Wang et al.

(Continued)

*Primary Examiner* — Techane J Gergiso

(57) ABSTRACT

Methods and apparatuses for determining scrambling codes for minimizing co-channel interference in a communication system. A method in accordance with the present invention comprises defining at least one initial default sequence, generating a scrambling code, scrambling a signal using the generated scrambling code, comparing the scrambled signal with all other scrambled signals meeting a specified criterion, and saving the scrambling code word if the comparison determines that the signal scrambled with the scrambling code also meets the specified criterion. The scrambling codes can be compared with each other for cross-correlation purposes to determine whether they meet the specified criterion based on laboratory testing.

19 Claims, 8 Drawing Sheets

U.S. PATENT DOCUMENTS

| | | | |
|---|---|---|---|
| 6,473,417 B1 * | 10/2002 | Herzog | 370/342 |
| 6,549,782 B2 | 4/2003 | Roy | |
| 6,707,916 B1 | 3/2004 | Caso et al. | |
| 6,853,633 B1 | 2/2005 | Ramesh | |
| 6,859,445 B1 | 2/2005 | Moon et al. | |
| 7,002,900 B2 | 2/2006 | Walton et al. | |
| 7,016,319 B2 | 3/2006 | Baum et al. | |
| 7,031,350 B2 | 4/2006 | Martini et al. | |
| 7,039,024 B2 | 5/2006 | Nefedov | |
| 7,082,113 B1 * | 7/2006 | Matusevich | 370/330 |
| 7,124,303 B2 | 10/2006 | Candelore et al. | |
| 7,154,846 B2 | 12/2006 | Chen et al. | |
| 7,161,988 B2 | 1/2007 | Lee et al. | |
| 7,174,452 B2 | 2/2007 | Carr | |
| 7,177,598 B2 * | 2/2007 | Klein et al. | 455/63.1 |
| 7,221,720 B2 | 5/2007 | Robinson | |
| 7,248,841 B2 | 7/2007 | Agee et al. | |
| 7,292,606 B2 | 11/2007 | Li | |
| 7,321,610 B2 * | 1/2008 | Lu | 375/148 |
| 7,412,209 B2 | 8/2008 | Santoru et al. | |
| 7,430,257 B1 * | 9/2008 | Shattil | 375/347 |
| 7,551,736 B2 | 6/2009 | Lee et al. | |
| 7,672,285 B2 | 3/2010 | Sun et al. | |
| 2001/0019952 A1 | 9/2001 | Ishida | |
| 2001/0055311 A1 | 12/2001 | Trachewsky et al. | |
| 2002/0042899 A1 | 4/2002 | Tzannes et al. | |
| 2002/0044614 A1 * | 4/2002 | Molnar et al. | 375/346 |
| 2002/0051433 A1 * | 5/2002 | Affes et al. | 370/335 |
| 2002/0054625 A1 | 5/2002 | Matsumoto et al. | |
| 2002/0058513 A1 | 5/2002 | Klein et al. | |
| 2002/0085623 A1 * | 7/2002 | Madkour et al. | 375/148 |
| 2002/0109631 A1 * | 8/2002 | Li et al. | 342/378 |
| 2002/0172264 A1 * | 11/2002 | Wiberg et al. | 375/147 |
| 2002/0196765 A1 * | 12/2002 | Tulino | 370/342 |
| 2003/0091108 A1 | 5/2003 | Tanaka | |
| 2003/0179698 A1 * | 9/2003 | Lu | 370/209 |
| 2004/0028006 A1 | 2/2004 | Kayama et al. | |
| 2004/0116078 A1 * | 6/2004 | Rooyen et al. | 455/101 |
| 2004/0131025 A1 | 7/2004 | Dohler et al. | |
| 2004/0178934 A1 | 9/2004 | Balakrishnan et al. | |
| 2004/0179547 A1 * | 9/2004 | Kuffner et al. | 370/465 |
| 2004/0192395 A1 * | 9/2004 | Karabinis | 455/562.1 |
| 2005/0074071 A1 * | 4/2005 | Papathanasiou et al. | 375/267 |
| 2005/0111408 A1 * | 5/2005 | Skillermark et al. | 370/331 |
| 2005/0180373 A1 * | 8/2005 | Papasakellariou et al. | 370/342 |
| 2005/0226414 A1 | 10/2005 | Lee et al. | |
| 2005/0226418 A1 | 10/2005 | Lee et al. | |
| 2005/0229230 A1 | 10/2005 | Santoru et al. | |
| 2005/0286405 A1 * | 12/2005 | Sun et al. | 370/208 |
| 2006/0050662 A1 * | 3/2006 | Rizvi et al. | 370/320 |
| 2006/0153283 A1 * | 7/2006 | Scharf et al. | 375/148 |
| 2006/0153313 A1 * | 7/2006 | Lee et al. | 375/285 |
| 2006/0227894 A1 | 10/2006 | Lee et al. | |
| 2007/0025299 A1 * | 2/2007 | Scharf et al. | 370/335 |

FOREIGN PATENT DOCUMENTS

| | | |
|---|---|---|
| EP | 1037401 A2 | 9/2000 |
| EP | 1063791 A2 | 12/2000 |
| EP | 1271982 A1 | 1/2003 |
| JP | 5049140 | 2/1993 |
| JP | 07-297753 | 11/1995 |
| JP | 08-330913 | 12/1996 |
| JP | 9261118 | 10/1997 |
| JP | 2000-082976 | 3/2000 |
| JP | 3144780 B2 | 3/2001 |
| JP | 2002-208880 | 7/2002 |
| JP | 2002335191 | 11/2002 |
| JP | 2003-219478 | 7/2003 |
| WO | 97/01256 A1 | 1/1997 |
| WO | 98/49857 | 11/1998 |
| WO | 99/52230 | 10/1999 |
| WO | 00/69088 | 11/2000 |
| WO | 03/079577 | 9/2003 |
| WO | 03/079577 A2 | 9/2003 |
| WO | 03/092212 A1 | 11/2003 |
| WO | 03092212 | 11/2003 |
| WO | 2007022627 A1 | 3/2007 |

OTHER PUBLICATIONS

ETSI; "Digital Video Broadcasting (DVB); Second Generation Framing Structure, Channel Coding and Modulation Systems for Broadcasting, Interactive Services, News Gathering and Other Broadband Satellite Applications"; Draft ETS EN 302 307 V1.1.1; Jun. 1, 2004; ETSI Standards; Lis, Sophia Antipolis Cedex, France; vol. BC, No. V1.1.1; XP014015373; ISSN: 0000-0001.

EPO Communication dated Jul. 21, 2008 in European counterpart Application No. 06789990.6 corresponding to U.S. Appl. No. 11/510,244, filed Aug. 25, 2006 by Judith Wang et al.

International Search Report and Written Opinion dated Dec. 27, 2006 in International counterpart Application No. PCT/US2006/033211 corresponding to U.S. Appl. No. 11/510,244, filed Aug. 25, 2006 by Judith Wang et al.

Naguleswaran, S., Rice, M. and Schroeder, J.E.; "Channel Compensation Techniques in a Receiver with Adaptive MAI Suppression"; 2002; IEEE (0-7803-7576-09/02); entire document; http://ieeexplore.ieee.org/iel5/8521/26928/01197156.pdf.

Ponnampalam, Vishakan and Jones, Alan E.; "On Cell Parameter ID Assignment in Utra-TDD"; Personal, Indoor and Mobile Radio Communications; 2004; PIMRC 2004; 15$^{th}$ IEEE International Symposium; Barcelona, Spain; Sep. 5-8, 2004; Piscataway, New Jersey; vol. 3; pp. 2051-2054; XP010754293; ISBN: 0-7803-8523-3; Section III and Section IV.

Al-Meshhadany, Thamer and Al Agha, Khaldoun; "Analysis of the Code Allocation Mechanism in the WCDMA"; Mobile and Wireless Communications Network; 2002; 4$^{th}$ International Workshop; Sep. 9-11, 2002; Piscataway, New Jersey; pp. 196-199; XP010611845; ISBN: 0-7803-7605-6; pp. 196-197.

EPO communication intending grant of patent dated Dec. 23, 2010 in European Patent Application No. 06789990.6 filed Aug. 25, 2006 by Judith Wang et al.

Chinese Office action dated Nov. 3, 2010 in Chinese Patent Application No. 200680031206.4 filed Aug. 25, 2006 by Judith Wang et al.

George, Maria; Hamid, Mujtaba; Miller, Andy; "Gold Code Generators in Virtex Devices"; [Online] Jun. 29, 2000; www.xilinx.com.

Lee, Jhong Sam; Miller, Leonard; "CDMA Systems Engineering Handbook"; Jul. 1, 1998; Artech House Publishers; ISBN: 0890069905; pp. 644-667.

Holma, Harri; Toskala, Antti; "WCDMA for UMTS"; chapter 6.3.1.; Jun. 21, 2001; Wiley; England; ISBN: 0471486876; vol. revised; p. 74.

Chinese Office action dated Feb. 23, 2011 in Chinese Patent Application No. 200580018545.4 filed Apr. 11, 2005 by Lin-Nan Lee et al.

* cited by examiner

METHODS AND APPARATUSES FOR DETERMINING SCRAMBLING CODES FOR SIGNAL TRANSMISSION

BACKGROUND OF THE INVENTION

1. Field of the Invention

The present invention relates to communication systems, and more particularly to methods and apparatuses for minimizing signal interference.

2. Description of the Related Art

FIG. 1 illustrates a typical satellite television system of the related art.

FIG. 1 shows a communications system, specifically a television broadcasting system 100, which transmits and receives audio, video, and data signals via satellite. Although the present invention is described in the context of a satellite-based television broadcasting system, the techniques described herein are equally applicable to other methods of program content delivery, such as terrestrial over-the-air systems, cable-based systems, and the Internet. Further, while the present invention will be described primarily with respect to television content (i.e. audio and video content), the present invention can be practiced with a wide variety of program content material, including video content, audio content, audio and video related content (e.g., television viewer channels), or data content (e.g., computer data).

Television broadcasting system 100 includes transmission station 102, uplink dish 104, at least one satellite 106, and receiver stations 108A-108C (collectively referred to as receiver stations 108). Transmission station 102 includes a plurality of inputs 110 for receiving various signals, such as analog television signals, digital television signals, video tape signals, original programming signals and computer generated signals containing HTML content. Additionally, inputs 110 receive signals from digital video servers having hard discs or other digital storage media. Transmission station 102 also includes a plurality of timing inputs 112, which provide electronic schedule information about the timing and content of various television channels, such as that found in television schedules contained in newspapers and television guides. Program guide data may also be manually entered at the site of transmission station 102. The program guide data consists of a plurality of "objects". The program guide data objects include data for constructing an electronic program guide that is ultimately displayed on a user's television monitor.

Transmission station 102 receives and processes the various input signals received on inputs 110 and timing inputs 112, converts the received signals into a standard form, combines the standard signals into a single output data stream 114, and continuously sends output data stream 114 to uplink dish 104. Output data stream 114 is a digital data stream that is typically compressed using MPEG-2 encoding, although other compression schemes, such as MPEG-4 or other schemes, may be used.

The digital data in output data stream 114 are divided into a plurality of packets, with each such packet marked with a Service Channel Identification (SCID) number. The SCIDs can be used by a receiver in receiver station 108 to identify the packets that correspond to each television channel. Error correction data is also included in output data stream 114.

Output data stream 114 is typically a multiplexed signal that is modulated by transmission station 102 using standard frequency and polarization modulation techniques. Output data stream 114 preferably includes a plurality of frequency bands, typically sixteen frequency bands, with each frequency band being either left polarized or right polarized. Alternatively, vertical and horizontal polarizations may be used.

Uplink dish 104 continuously receives output data stream 114 from transmission station 102, amplifies the received signal and transmits signal 116 to at least one satellite 106. Although a single uplink dish 104 and three satellites 106 are shown in FIG. 1, multiple uplink dishes 104 and a larger number of satellites 106 are preferably used to provide additional bandwidth, and to help ensure continuous delivery of signals 114 to receiver stations 108.

Satellites 106 revolve in geosynchronous orbit about the earth. Satellites 106 each include a plurality of transponders that receive signals 116 transmitted by uplink dish 104, amplify the received signals 116, frequency shift the received signals 116 to different frequency bands, and then transmit the amplified, frequency shifted signals 118 back to desired geographic areas on the Earth, where receiver stations 108 are located or will be located at some time in the future. Receiver stations 108 then receive and process the signals 118 transmitted by satellites 106.

Each satellite 106 typically broadcasts signals 118 in thirty-two (32) different frequencies, which are licensed to various users for broadcasting of programming, which can be audio, video, or data signals, or any combination. These signals are typically located in the Ku-band of frequencies, i.e., 11-18 GHz, but can be broadcast in the Ka-band of frequencies, i.e., 18-40 GHz, more typically in the 20-30 GHz range, or other frequency bands.

FIG. 2 is a block diagram of one of receiver stations 108, which receives and decodes audio, video and data signals. Typically, receiver station 108 is a "set top box," also known as an Integrated Receiver Decoder (IRD), which is usually resident in a home or multi-dwelling unit, for reception of satellite broadcasted television signals 118. Receiver station 108 may also be a Personal Video Recorder (PVR) which can record signals for playback at a later date.

Receiver dish 200 can be an Outdoor Unit (ODU), which is usually a smaller dish antenna mounted on a home or multi-dwelling unit. However, receiver dish 200 can also be a larger ground-mounted antenna dish if desired.

Receiver dish 200 typically uses a reflector dish and feedhorn assembly to receive and direct downlink signals 118 to receiver station 108 via a wire or coaxial cable. Each receiver station has a dedicated cable that allows receiver dish 200, via a multiswitch, to selectively direct downlink signals 118 to receiver station 108, and allows receiver station 108 to determine which of the signals 118 is desired.

Receiver station 108 typically includes receiver dish 200, alternate content source 202, receiver 204, monitor 206, recording device 208, remote control 210 and access card 212. Receiver 204 includes tuner 214/demodulator/Forward Error Correction (FEC) decoder 216, digital-to-analog (D/A) converter 218, CPU 220, clock 222, memory 224, logic circuit 226, interface 228, infrared (IR) receiver 230 and access card interface 232. Receiver dish 200 receives signals 118 sent by satellites 106, amplifies the signals 118 and passes the signals 118 on to tuner 214. Tuner 214 and demodulator/FEC decoder 216 operate under control of CPU 220.

The CPU 220 operates under control of an operating system stored in the memory 224 or within an auxiliary memory within the CPU 220. The functions performed by CPU 220 are controlled by one or more control programs or applications stored in memory 224. Operating system and applications are comprised of instructions which, when read and executed by the CPU 220, cause the receiver 204 to perform the functions and steps necessary to implement and/or use the present invention, typically, by accessing and manipulating data stored in the memory 224. Instructions implementing such applications are tangibly embodied in a computer-readable medium, such as the memory 224 or the access card 212. The CPU 220 may also communicate with other devices through interface 228 or the receiver dish 200 to accept commands or instructions to be stored in the memory 224, thereby making a computer program product or article of manufacture according to the invention. As such, the terms "article of manufacture," "program storage device" and "computer program product" as used herein are intended to encompass any application accessible by the CPU 220 from any computer readable device or media.

Memory 224 and access card 212 store a variety of parameters for receiver 204, such as a list of channels receiver 204 is authorized to process and generate displays for; the zip code and area code for the area in which receiver 204 is used; the model name or number of receiver 204; a serial number of receiver 204; a serial number of access card 212; the name, address and phone number of the owner of receiver 204; and the name of the manufacturer of receiver 204.

Access card 212 is removable from receiver 204 (as shown in FIG. 2). When inserted into receiver 204, access card 212 is coupled to access card interface 232, which communicates via interface 228 to a customer service center (not pictured). Access card 212 receives access authorization information from the customer service center based on a user's particular account information. In addition, access card 212 and the customer service center communicate regarding billing and ordering of services.

Clock 222 provides the current local time to CPU 220. Interface 228 is preferably coupled to a telephone jack 234 at the site of receiver station 108. Interface 228 allows receiver 204 to communicate with transmission station 102 as shown in FIG. 1 via telephone jack 234. Interface 228 may also be used to transfer data to and from a network, such as the Internet.

The signals sent from receiver dish 200 to tuner 214 are a plurality of modulated Radio Frequency (RF) signals. The desired RF signal is then downconverted to baseband by the tuner 214, which also generates in-phase and quadrature-phase (I and Q) signals. These two signals are then passed to the demodulator/FEC Application Specific Integrated Circuit (ASIC) 216. The demodulator 216 ASIC then demodulates the I and Q signals, and the FEC decoder correctly identifies each transmitted symbol. The received symbols for Quaternary Phase Shift Keying (QPSK) or 8PSK signals carry two or three data bits, respectively. The corrected symbols are translated into data bits, which in turn are assembled in to payload data bytes, and ultimately into data packets. The data packets may carry 130 data bytes or 188 bytes (187 data bytes and 1 sync byte).

In addition to the digital satellite signals received by receiver dish 200, other sources of television content are also preferably used. For example, alternate content source 202 provides additional television content to monitor 206. Alternate content source 202 is coupled to tuner 214. Alternate content source 202 can be an antenna for receiving off the air signals National Television Standards Committee (NTSC) signals, a cable for receiving American Television Standards Committee (ATSC) signals, or other content source. Although only one alternate content source 202 is shown, multiple sources can be used.

Initially, as data enters receiver 204, CPU 220 looks for initialization data which is referred to commonly in the industry as a boot object. A boot object identifies the SCIDs where all other program guide objects can be found. Boot objects are always transmitted with the same SCID, so CPU 220 knows that it must look for packets marked with that SCID. The information from the boot object is used by CPU 220 to identify packets of program guide data and route them to memory 224.

Remote control 210 emits Infrared (IR) signals 236 that are received by infrared receiver 230 in receiver 204. Other types of data entry devices may alternatively be used, by way of example and not limitation, such as an ultra-high frequency (UHF) remote control, a keypad on receiver 204, a remote keyboard and a remote mouse. When a user requests the display of a program guide by pressing the "guide" button on remote control 210, a guide request signal is received by IR receiver 230 and transmitted to logic circuit 226. Logic circuit 226 informs CPU 220 of the guide request. In response to the guide request, CPU 220 causes memory 224 to transfer a program guide digital image to D/A converter 218. D/A converter 218, converts the program guide digital image into a standard analog television signal, which is then transmitted to monitor 206. Monitor 206 then displays the TV video and audio signals. Monitor 206 may alternatively be a digital television, in which case no digital to analog conversion in receiver 204 is necessary.

Users interact with the electronic program guide using remote control 210. Examples of user interactions include selecting a particular channel or requesting additional guide information. When a user selects a channel using remote control 210, IR receiver 230 relays the user's selection to logic circuit 226, which then passes the selection on to memory 224 where it is accessed by CPU 220. CPU 220 performs an MPEG2 decoding step on received audio, video, and other packets from FEC decoder 216 and outputs the audio and video signals for the selected channel to D/A converter 218. D/A converter 218 converts the digital signals to analog signals, and outputs the analog signals to monitor 206.

Such communications systems 100, here by example which is shown a television broadcast system 100, have embraced the demand for high quality transmissions made possible by digital technology. As the packets and other data are transmitted from uplink dish 104 to receiver 108, the symbols and bits in packets intended for other receiver stations 108 are typically transmitted down from satellite 106 to receiver 108 on the same frequency, because the transmit frequency is controlled by the limitations of satellites 108, and the transmit frequencies that are available are controlled by government permission for transmission at specific frequencies within the frequency spectrum.

Further, the data frames are coded in such a manner that they can interfere with each other, and receiver 108 cannot tell which packets of data that receiver 108 is supposed to decode and present on monitor 206. Such interference is called "co-channel" interference, where one channel of data interferes with the reception and demodulation of another channel of data. In practical applications, the co-channel interference may also stem from transmission of other system operators, a satellite 106 operating in an adjacent orbital slot, or other spot transmission beams in a spot beam satellite broadcasting system 100.

As communications systems 100 transmits more data, i.e., more channels of programming on a satellite broadcast system that are viewable on monitor 206, the interference between data transmission will increase, and, as such, the quality of the signal reception will be poorer.

To make optimal use of the available spectrum and to deliver a high number of different channels of programming, RF transmissions with the same frequencies may be directed to different geographic areas. However in areas bordering the different service areas, it is possible that a receiving station may detect a wanted transmission, but also other co-frequency transmissions. The unwanted transmissions are interference and may severely degrade the overall performance of the wanted channel receiver.

Traditionally, the negative effects of co-channel interference have been minimized by redesigning the frequency assignments assigned to the various transponders or satellites 106. But this will not alleviate the problem beyond a certain point.

It can be seen, then, that there is a need in the art to minimize the interference in a broadcasting system.

SUMMARY OF THE INVENTION

To minimize the limitations in the prior art, and to minimize other limitations that will become apparent upon reading and understanding the present specification, the present invention discloses methods and apparatuses for determining scrambling codes for minimizing co-channel interference in a communication system. A method in accordance with the present invention comprises defining at least one initial default sequence, generating a scrambling code, scrambling a signal using the generated scrambling code, comparing the scrambled signal with all other scrambled signals meeting a specified criterion, and saving the scrambling code word if the comparison determines that the signal scrambled with the scrambling code also meets the specified criterion.

Still other aspects, features, and advantages of the present invention are inherent in the systems and methods claimed and disclosed or will be apparent from the following detailed description and attached drawings. The detailed description and attached drawings merely illustrate particular embodiments and implementations of the present invention, however, the present invention is also capable of other and different embodiments, and its several details can be modified in various respects, all without departing from the spirit and scope of the present invention. Accordingly, the drawings and description are to be regarded as illustrative in nature, and not as a restriction on the present invention.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

Figure 1:
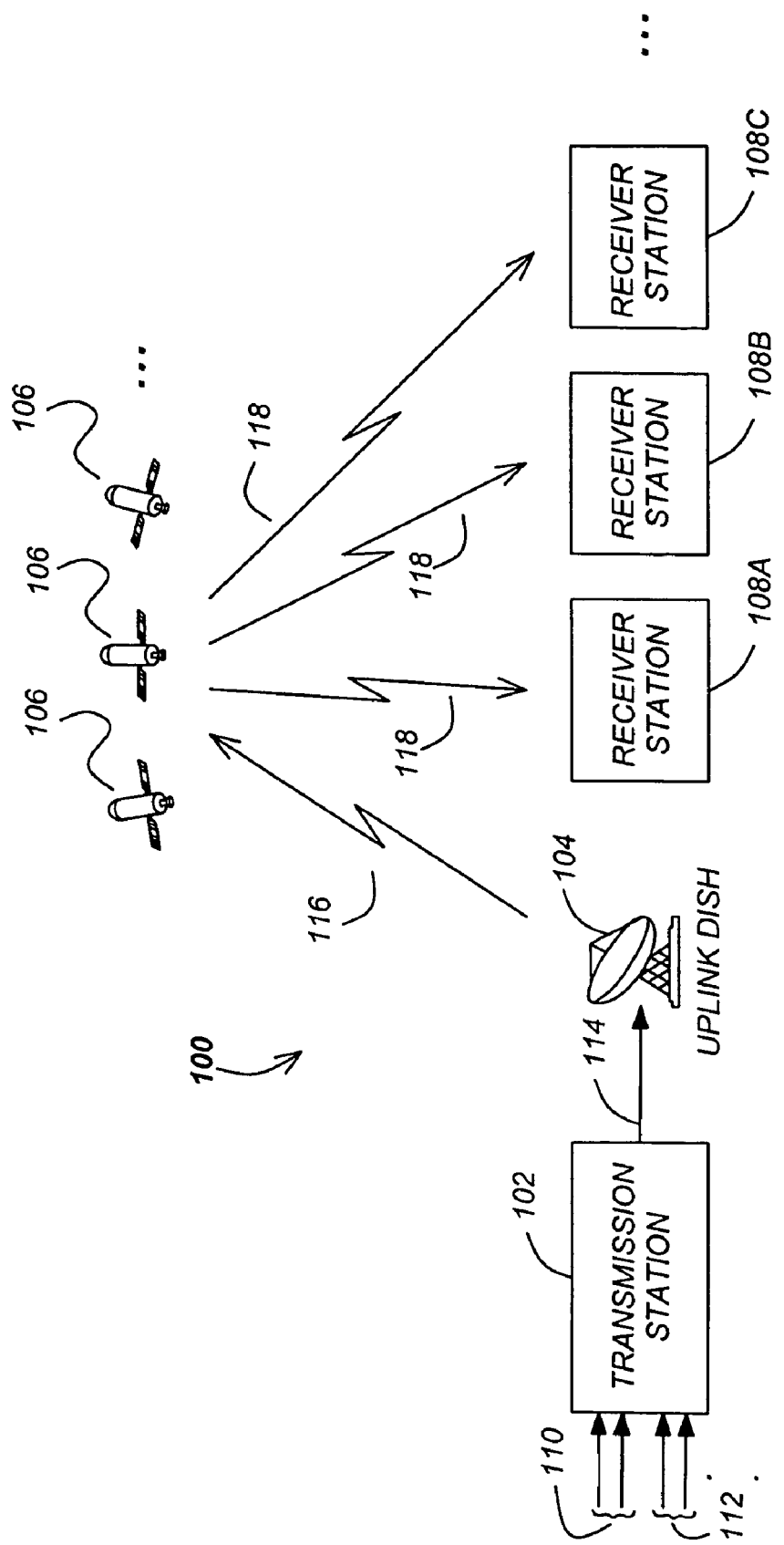
FIG. 1 illustrates a typical satellite based broadcast systems of the related art.

An apparatus, method, and software for reducing co-channel interference in a digital broadcast and interactive system are described. In the following description, reference is made to the accompanying drawings which form a part hereof, and which show, by way of illustration, several embodiments of the present invention. It is understood that other embodiments may be utilized and structural changes may be made without departing from the scope of the present invention.

Overview

In the present invention, the digital data transmitted from transmission station 102 via signal 114, satellites 106, and signal 118. The digital data contains three main components: a header portion of a data frame, called the physical layer header or PL header; payload data; and optionally, additional inserted symbols, called pilot symbols, which are used by the receiver 108 to mitigate the deleterious effects of degradation in the receiver station 108, primarily phase noise. By using the PL header, the demodulator/FEC-decoder 216 can quickly acquire the correct phase at the beginning of every data frame. For many 8PSK and QPSK transmission modes, pilot symbols are also needed to track the phase noise more accurately. However, in certain instances, when the PL headers for a desired signal and an interfering co-frequency signal align in time, the interference is so great that the demodulator/FEC-decoder 216 cannot determine with necessary accuracy the phase of the carrier frequency associated with the wanted signal. This means that as the demodulator 216 tries to maintain a phase lock on the desired signal, the undesired signal presents the same header symbols or pilot symbols, and the demodulator 216 can be confused by the presence of the undesired signal, and therefore unable to track the phase of the desired signal. Such confusion in the demodulator 216 is known in the art as having the demodulator 216 being "pulled off" of the desired signal. If the demodulator 216 is pulled toward 45 degrees from the optimal constellation point for a QPSK transmission, the demodulator will not identify the symbols correctly. This will introduce errors, and if not rectified quickly, the data errors will be identified as a loss of lock. This, in turn, will lead the microprocessor 220 to command the demodulator 216 to reacquire the signal, which leads to loss of data until the desired signal is reacquired. Such a loss of data would present incorrect data on monitor 206, and possibly a service interruption on monitor 206 as viewed by a viewer. Rather than viewing a desired television channel with motion and dialog on a given monitor 206, the co-channel interference would cause the viewer to see the monitor fade to a dark screen, or see a garbled picture, or hear garbled audio. It is apparent that co-channel interference can create deleterious effects on a television broadcast system 100.

The present invention provides several factors that will mitigate the effect of such co-channel interference.

System Overview

In broadcast applications, continuous mode receivers 108 are widely used. Scrambling and error-correction codes that perform well in low signal-to-noise (SNR) environments are at odds with these receivers 108 with respect to synchronization (e.g., carrier phase and carrier frequency). Physical layer header and/or pilot symbols can be used for such synchronization. Accordingly, an important consideration with respect to system performance is that of co-channel interference on physical layer header and/or pilot symbols. Because physical layer header and/or pilots are used for acquiring and/or tracking carrier phase and carrier frequency, such interference can degrade receiver performance.

Many digital broadcast systems 100 require use of additional training symbols beyond that of the normal overhead bits in a frame structure for their synchronization processes. The increase in overhead is particularly required when the Signal-to-Noise (SNR) is low relative to the required levels and in combination or singly, the phase noise is high; such an environment is typical when high performance codes are used in conjunction with high order modulation. Traditionally, continuous mode receivers utilize a feedback control loop to acquire and track carrier frequency and phase. Such approaches that are purely based on feedback control loops are prone to strong Radio Frequency (RF) phase noise and thermal noise, causing high cycle slip rates and an error floor on the overall receiver performance. Thus these approaches are burdened by increased overhead in terms of training symbols for certain performance target, in addition to limited acquisition range and long acquisition time. Further, these conventional synchronization techniques are dependent on the particular modulation scheme, thereby hindering flexibility in use of modulation schemes.

In system 100, the receivers 108 typically achieve carrier synchronization by examining the preambles, headers, and/or unique scrambling codes or unique words (UW) that are embedded in broadcast data frame structures (shown in FIG. 4A), thereby reducing the use of additional overhead specifically designated for training purposes.

In such a discrete communications system 100, the transmission facility 102 produces a discrete set of possible messages representing media content (e.g., audio, video, textual information, data, etc.); each of the possible messages has a corresponding signal waveform. These signal waveforms are attenuated, or otherwise altered, by communications channel 116 and 118. To combat the noise in the broadcast channel 116 and 118, the transmission facility 102 utilizes forward-error-correction codes, such as Low Density Parity Check (LDPC) codes, or a concatenation of different FEC codes.

The LDPC or other FEC code or codes that are generated by the transmission facility 102 facilitate high speed implementation without incurring any performance loss. These structured LDPC codes output from the transmission facility 102 avoid assignment of a small number of check nodes to the bit nodes already vulnerable to channel errors by virtue of the modulation scheme (e.g., 8PSK). Such LDPC codes have a parallelizable decoding process (unlike turbo codes), which advantageously involves simple operations such as addition, comparison and table look-up. Moreover, carefully designed LDPC codes do not exhibit a shallow error floor, e.g., there is no decrease in errors even though the signal-to-noise ratio increases. If an error floor were to exist, it would be possible to use another code, such as a Bose/Chaudhuri/Hocquenghem (BCH) code or other codes, to significantly suppress such error floor.

According to one embodiment of the present invention, the transmission facility 102 generates, using a relatively simple encoding technique as explained below in FIG. 2, scrambling codes that are generated based on their ability to combat co-channel interference.

Transmitter Functions

Figure 2:
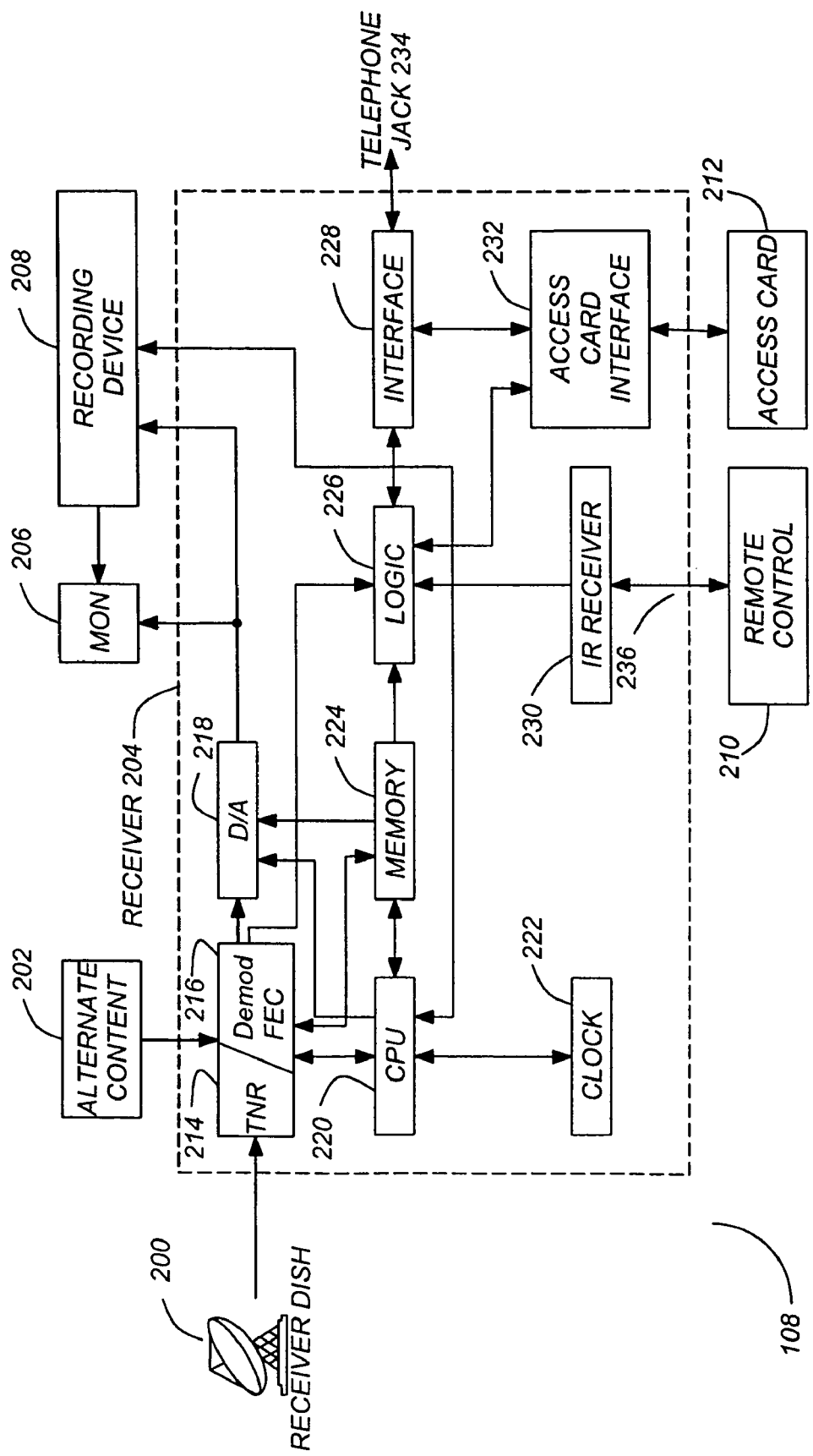
FIG. 2 is a block diagram of a receiver station which receives and decodes audio, video and data signals.
Figure 3A:
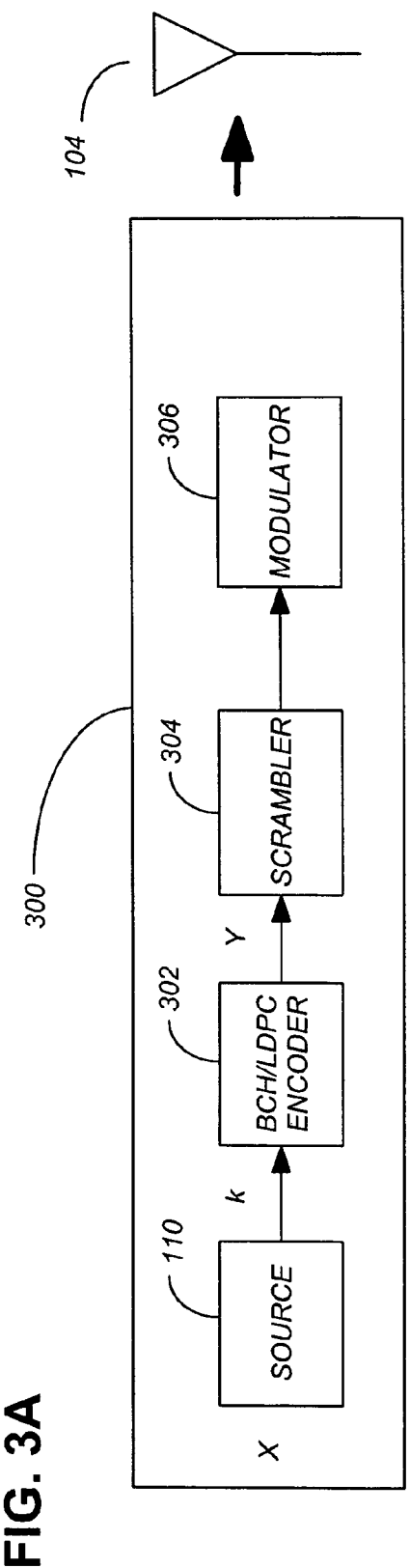
FIGS. 3A-3B are diagrams of an exemplary transmitter and demodulator employed in the digital transmission facility of the system of FIGS. 1-2.

FIG. 3A is a diagram of an exemplary transmitter employed in the digital transmission facility of the system 100 of FIG. 2A. A transmitter 300 in transmission facility 102 is equipped with an LDPC/BCH encoder 302 that accepts input from an information source 110 and outputs coded stream of higher redundancy suitable for error correction processing at the receiver 108. The information source 110 generates signal k from input X. LDPC codes are specified with parity check matrices. Encoding LDPC codes requires, in general, specifying the generator matrices. BCH codes are included to reduce the error floor of system 100, which improves error correction performance.

Encoder 302 generates signal Y to a scrambler 304 and a modulator 306, using a simple encoding technique that makes use of only the parity check matrix by imposing structure onto the parity check matrix. Specifically, a restriction is placed on the parity check matrix by constraining certain portion of the matrix to be triangular. Such a restriction results in a high computation efficiency with negligible performance loss, and therefore, constitutes an attractive trade-off.

Scrambler 304 scrambles the FEC encoded symbols in accordance with the present invention to minimize co-channel interference, as will be more fully described below.

Modulator 306 maps the scrambled messages from scrambler 304 output to signal waveforms that are transmitted to a transmit antenna 104, which emits these waveforms over the communication channel 116. The transmissions from the transmit antenna 104 propagate to a demodulator, as discussed below. In the case of a satellite communication system, the transmitted signals from the antenna 104 are relayed via a satellite to receiver 108 as shown in FIG. 1.

Demodulator

Figure 3B:
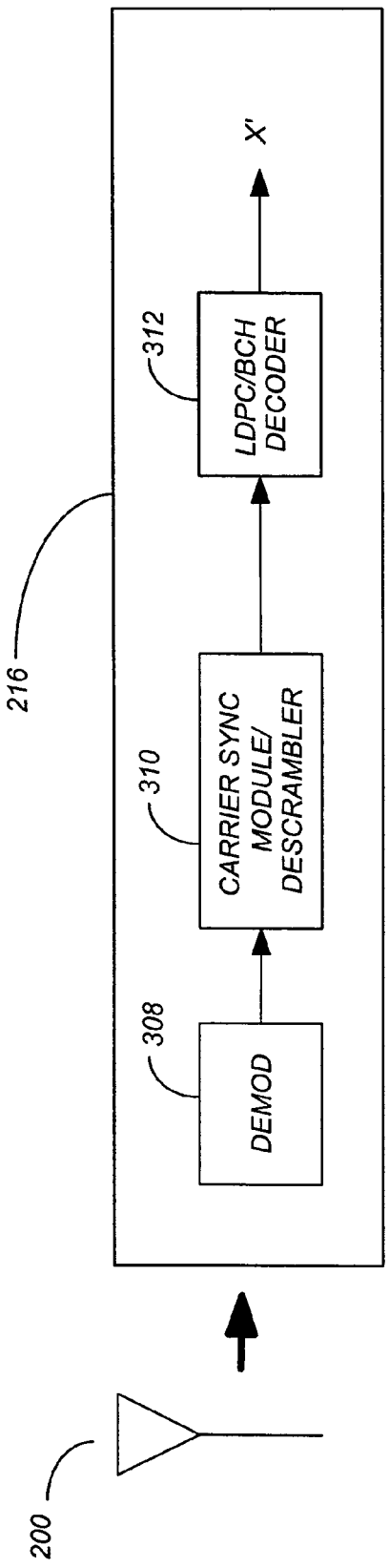

FIG. 3B is a diagram of an exemplary demodulator/FEC decoder 216 in the system of FIG. 2. The demodulator/FEC decoder 216 comprises a demodulator 308, a carrier synchronization module/descrambler 310, and a LDPC/BCH decoder 312 and supports reception of signals from the transmitter 300 via antenna 200. According to one embodiment of the present invention, the demodulator 308 provides filtering and symbol timing synchronization of the LDPC encoded signals received from antenna 200, and carrier synchronization module 310 provides frame synchronization, frequency and phase acquisition and tracking and descrambling of the signals output from the demodulator 308. After demodulation, the signals are forwarded to an LDPC decoder 312, which attempts to reconstruct the original source messages by generating messages, X'.

With respect to the receiving side, if both the desired and interfering carriers use the same modulation and coding configuration (or mode), when the frame header (shown in FIG. 4A) are aligned in time while their relative frequency offset are small, the interference can cause significant errors in phase estimation for the demodulator. As a result, the demodulator can put out errors periodically, when the signal and interference frames line up in time. This condition occurs when frequency and symbol clock of the signals in question are sufficiently close, although they may be drifting with respect to each other.

Frame Structure

Figure 4A:
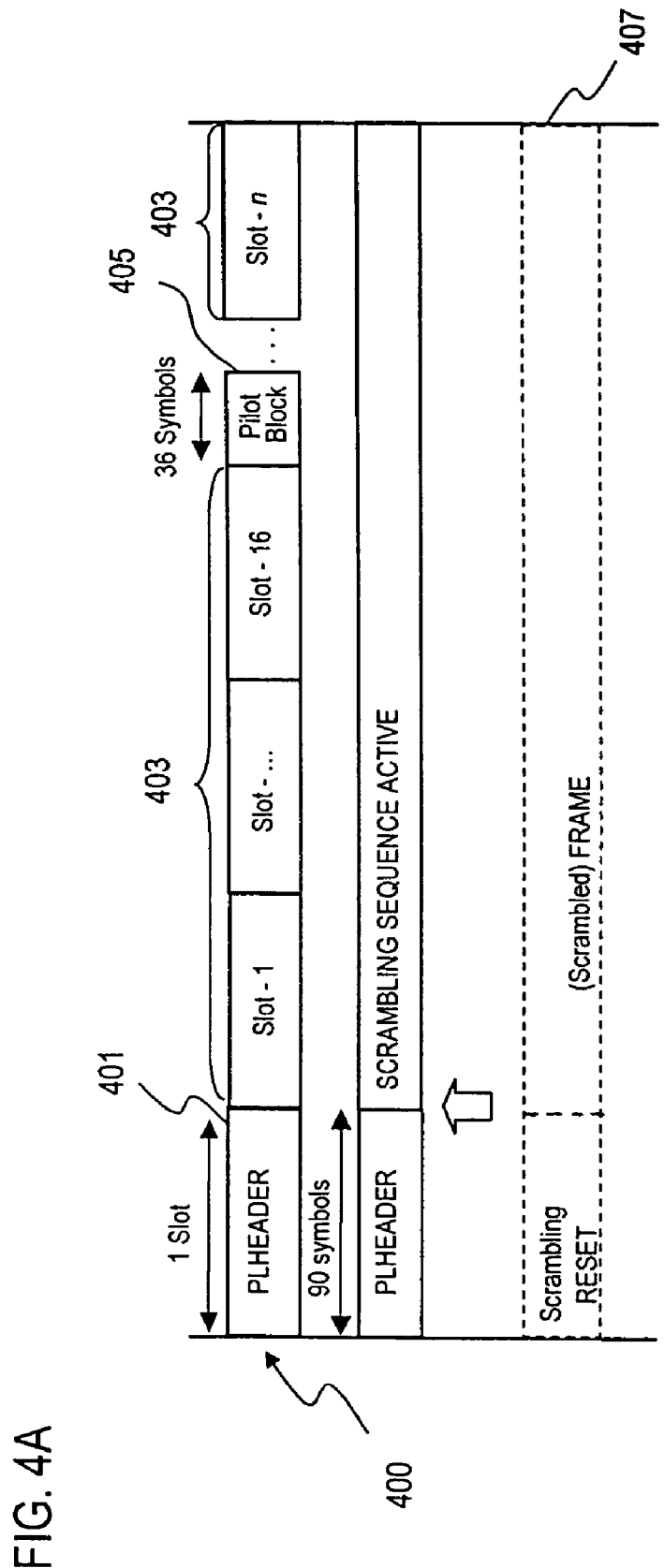
FIGS. 4A and 4B are diagrams of a frame structure used in the system of FIG. 3, and of logic for scrambling the frame headers with different Unique Words (UWs), in accordance with an embodiment of the present invention.

FIG. 4A is a diagram of an exemplary frame structure used in the system of the present invention. By way of example, an LDPC coded frame 400, which can support, for example, satellite broadcasting and interactive services, is shown. The frame 400 includes a Physical Layer Header (denoted "PL Header") 401 and occupies one slot, as well as other slots 403 for data or other payload. In addition, the frame 400, according to one embodiment of the present invention, utilizes a pilot block 405 after every 16 slots to aid synchronization of carrier phase and frequency. It is noted that the pilot blocks 405 are optional. Although shown after 16 slots 403, the pilot block (or pilot sequence) 405, which can represent a scrambled block, can be inserted anywhere along the frame 400.

In an exemplary embodiment, the pilot insertion process inserts pilot blocks every 1440 symbols. Under this scenario, the pilot block includes 36 pilot symbols. For instance, in the physical layer frame 400, the first pilot block is thus inserted 1440 payload symbols after the start of the PL Header 401, the second pilot block is inserted 2880 payload symbols after, etc. If the pilot block position coincides with the beginning of the next PL Header 401, then the pilot block 405 is not inserted.

The carrier synchronization module 310 (FIG. 3), according to an embodiment of the present invention, utilizes the PL Header 401 and/or pilot block 405 for carrier frequency and phase synchronization. The PL Header 401 and/or pilot block 405 may be used for carrier synchronization, i.e., for assisting with the operation of frequency acquisition and tracking, and phase tracking loop. As such, the PL Header 401 and pilot block 405 are considered "training" or "pilot" symbols, and constitute, individually or collectively, a training block.

Each PL header 401 typically comprises a Start Of Frame (SOF) section comprising 26 symbols, and a Physical Layer Signaling Code field (PLS code) comprising 64 symbols. Typically, the SOF section is identical for all PL headers 401 for all of the signals being transmitted without further scrambling.

For QPSK, 8PSK, and other modulations, the pilot sequence 405 is a 36-symbol long segment (with each symbol being $(1+j)/\sqrt{2}$). In the frame 400, the pilot sequence 405 can be inserted after 1440 symbols of data. Under this scenario, the PL Header 401 can have 64 possible formats depending on the modulation, coding and pilot configuration.

When the PL headers 401 of the interfering carrier and the desired carrier (i.e., co-channels) are aligned in time, the coherent contribution from the interfering PL Header 401 can introduce significant phase error, causing unacceptable degradation in performance. Likewise, if both co-channels use pilot symbols (with both using the same Gold code sequence for the pilot blocks 405), the pilot blocks 405 will be scrambled exactly the same way such that the coherent contribution of the pilot block in the interfering carrier (or co-channel) is still problematic.

To mitigate the effect of co-channel interference, the frame 400 is scrambled, in pilot mode. In general, in this mode, the non-header portion 407 is scrambled with a Gold code sequence unique to the transmitter. However, in a broadcast mode, the entire frame 400, including the pilot block 405, is scrambled using a common code; e.g., all the receivers 105 are supplied with the same Gold sequence.

Applying Different Scrambling Codes to the PL Header

Figure 4B:
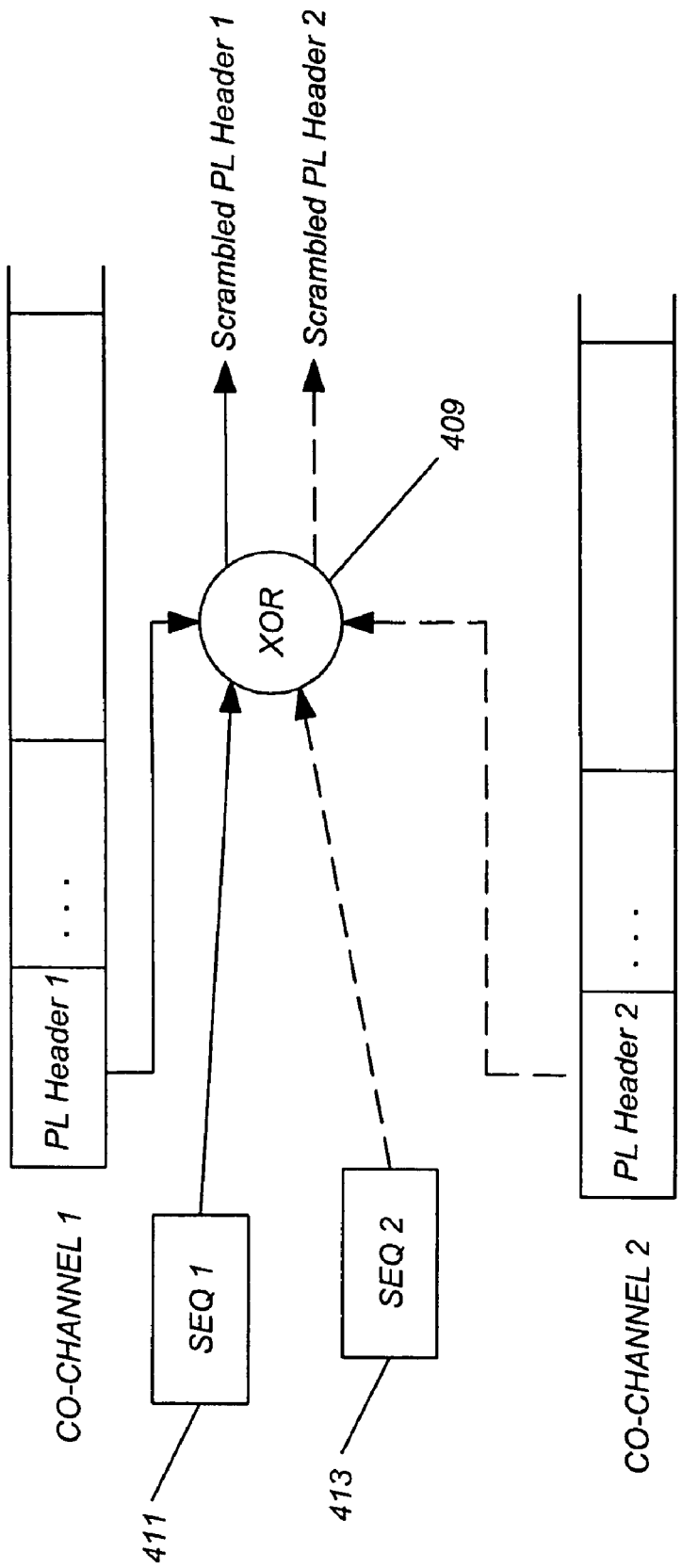

As seen in FIG. 4B, to reduce the impact of co-channel interference, several different Unique Word (UW) patterns of the same length as the PL header 401 can be utilized for the respective co-channels to scramble the PL headers 401. For example, an eXclusive-OR (via an XOR logic 409) of the different UW patterns 411, 413 with the PL HEADER 401 can be performed for the desired and interfering carriers (i.e., co-channels). Under this approach, power associated with the PL Header 401 of the interfering carrier no longer adds coherently to the PL Header 401 of the desired carrier.

Although the frame 400 is described with respect to a structure that supports satellite broadcasting and interactive services (and compliant with the Digital Video Broadcast (DVB)-S2 standard), it is recognized that the carrier synchronization techniques of the present invention can be applied to other frame structures.

Further, individual PL headers 401 can be scrambled prior to attaching the PL header 401 to the frame 400, and individual PL headers 401 can be scrambled without other PL headers 401 being scrambled. The invention envisions selecting scrambling codes (or seeds to generate the scrambling codes), or, alternatively, selecting no scrambling code, based on the expected co-channel interference between two data frames 400. The PL headers can be again scrambled as part of the data frame 400 scrambling as shown in FIG. 5, or otherwise encrypted using an encryption schema.

The codes 411 and 413 that are used to scramble the PL header 401 can be Gold codes as described herein, other seeded codes, or other coding schemes, without departing from the scope of the present invention. Such codes, or seeds for such codes, can be selected from a limited number of codes or seeds, and such codes or seeds can be sent to receiver 108 for use in descrambling the data frames 400 to demodulate and descramble the frames 400. The limited number of codes or seeds can be selected based on a number of factors, including the number of satellites 32, or the number of expected co-channel interferences in communication system 100.

Co-Channel Scrambling

Figure 5:
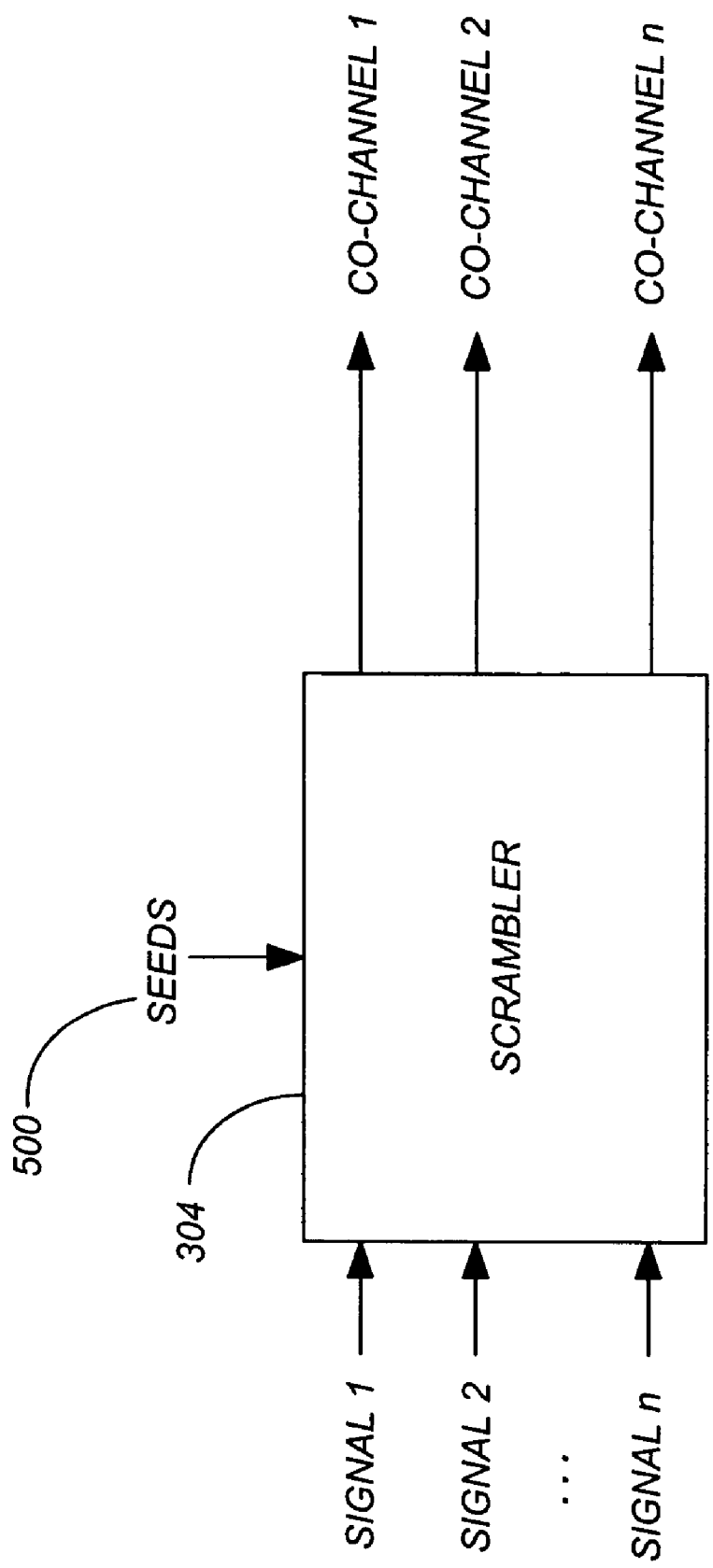
FIG. 5 is a diagram of a scrambler for isolating co-channel interference according to various embodiments of the present invention.

FIG. 5 is a diagram of a sequence scrambler for isolating co-channel interference, according to an embodiment of the present invention. A scrambling code is a complex sequence that can be constructed from a Gold code, according to one embodiment of the present invention. That is, a scrambler 304 generates a scrambling sequence Rn(i). Table 1 defines how the scrambling sequence Rn(i) scrambles the frame using the scrambler 304, according to the scrambler sequence generator of FIG. 6. In particular, Table 1 shows the mapping of an input symbol to an output symbol based on the output of the scrambler 304.

TABLE 1

| Rn(i) | Input(i) | Output(i) |
|---|---|---|
| 0 | I + jQ | I + jQ |
| 1 | I + jQ | −Q + jI |
| 2 | I + jQ | −I − jQ |
| 3 | I + jQ | Q − jI |

Using different seeds for either of such two m-sequence generators can generate different Gold sequences. By using different seeds 500 for different services, the mutual interference can be reduced.

In a broadcast mode, the 90 symbol physical layer header 401 can remain constant for a particular physical channel. The Gold sequence is reset at the beginning of each frame, and thus, the scrambled pilots are periodical as well with a period equal to the frame length. Because the information carrying data in a frame varies and appears to be random, the co-channel interference is random and degrades the operating SNR. Without using this scheme, due to the nature of time-invariance of the original PL header 401 and the pilot block 405, the carrier and phase estimation will be skewed for a receiver depending on these pilots and physical layer header for such acquisition and tracking. This will degrade the performance beyond those of SNR degradation associated with random data.

The scrambler 304 utilizes different scrambling sequences (n in FIG. 6) to further isolate the co-channel interference. One scrambling sequence is provided for the PL header and one for the pilots. Different pilots are specified in terms of different seeds from the n value of the Gold sequences.

As such, the present invention contemplates separate scrambling of several combinations of PL headers 401, pilot blocks 405, and payload 403 for co-channel interference mitigation. Depending on the complexity of the system, the PL headers 401 and pilot blocks 405 (if present) for a given channel can be scrambled using a different code than the co-channel without scrambling the payload 403. In essence, all non-payload 403 symbols that are present in one channel 400 are scrambled using one code, and all non-payload 403 symbols in another channel 400 are scrambled using a different code.

Further, the PL headers 401 and pilot blocks 405 (if present) for two different channels can be scrambled using different scrambling codes, and the payloads 403 for those channels can be scrambled using other codes. For example, a first scrambling sequence can be applied to a first PL header 401, and a second scrambling sequence can be applied to a second PL header 401. The first payload 403 has a third scrambling sequence applied (typically a Gold code), and the second payload has a fourth scrambling sequence applied (also typically a Gold code).

It is also contemplated within the present invention that there can be systems that use mated pairs of codes for the PL header 401 and the payload 403. So, a given scrambling code used on a PL header 401 is always used with a scrambling code used to scramble the payload 403 for that PL header 401. These code pairs can be applied to any signal 400, and can be re-assigned from one signal 400 to another signal 400 as desired.

It is also contemplated within the scope of the present invention that each payload 403 signal within system 100 receives a unique scrambling code. Further, each PL header 401 can receive a unique scrambling code, which can be mated with scrambling codes for the payloads 403 if desired.

Although described as a single scrambling sequence for a given channel 400, the present invention also contemplates that scrambling sequences can be changed or rotated after a given number of frames have been transmitted. The scrambling sequences for the PL header 401, the payload 403, or both can be rotated on a random or periodic basis as desired without departing from the scope of the present invention.

Application of Codes in Specific Order/Combinations

As seen in FIGS. 4A-4B, the Gold sequence seeds 500 (which are used to scramble payload 403) and header scrambling codes 411, 413 (used to scramble PL header 401) are applied to each signal. However, a given seed 500 does not necessarily work very well with a given header 411 code. The present invention determines the best seeds 500 and PL header codes 411 and ensures that the selected seed 500/header code 411 combinations will not interfere with other combinations of seed 500/header code 411 pairs.

To ensure that these pairs (of seeds 500/header codes 411 to be applied to a given channel) operate properly with all other pairs in the system 100, each pair must be checked against all other pairs for possible co-channel interference. If there are 1000 channels to be broadcast, then 1000 pairs of seed 500/header code 411 need to be generated and checked.

Seed Generation

Each of the seeds 500 is initially generated independently of the header codes 411. Each pair is sometimes referred to as an Advanced Modulation and Coding (AMC) scrambling code, and is given an AMC code number as an easy reference tool. For example, and not by way of limitation, AMC code 1 can be a combination of seed 500 (where the seed is "00") and a header code 411 (where the header code is code "01"). AMC code 2 would be a combination of a different seed 500 and a different header code 411. The transmitter 300 and demodulator 308 are then programmed with the AMC code numbers for each transponder of satellites 106, such that the demodulator 308 "knows" which AMC code to apply to a given signal for tuning and demodulation purposes.

Initially, the first seed (which results in a Gold scrambling sequence for each signal) is selected using a desired scheme, such as adopting the default seed from DVB-S2 broadcast standard. The second candidate seed 500 is selected from the remainder of the Gold sequence pool, calculating the cross-correlations of the candidate Gold sequence with respect to the first sequence as implemented in with a DVBS-2 transmission mode with pilot symbols. The candidate seed is kept only if all of its cross-correlations with the first seed are below a predetermined threshold for all pilot offsets, otherwise another candidate will be selected from the remaining seed pool for the second seed, and the process continues until the second seed is selected. A third candidate seed is then selected, and the cross correlations for the third transmission scrambled using the third candidate Gold code with each of the two prior transmissions are calculated. The third seed is selected only if its cross-correlations with both the first and second seeds are below the threshold for all pilot offsets, etc. The process continues until the required number of codes are identified. Thus all selected Gold sequences have cross-correlations with respect to each other below the predetermined threshold value indicating that transmissions using these seeds will not be well correlated with each other and hence will introduce minimal deleterious interference with each other. The threshold value is selected as a worst-case scenario for co-channel interference given the channel separation possible in the components used to build system 100. A subset of these seeds 500 can be reserved for specific portions of the system 100, e.g., used for the Boot Strap Loader (BSL), or for other purposes. As the permutations of these seed 500 sequences are compared, the codes can then be ranked by performance, with the best seeds 500 being ranked higher than the worst seeds 500, and thus, a rank order of seeds 500 can be created.

Cross-Correlation Comparison Method for Gold Code (Seed)

To generate a candidate Gold code, a default seed value of 1 is used in the saved set. The next consecutive seed 500 value is selected and the Gold code is computed. For a given non-backward compatible transmission mode, the correlation between the newly generated Gold code and those already generated is determined by $$\frac{1}{36} \max_{j=-35}^{35} \left| \sum_{i=0}^{35} a_{i+j} b_i^* \right|$$

where $a_i$=0 if i>35 or i<0

Where $a_{i+j}$ is the (i+j)-th symbol from the code for the first transmission and $b_i$ is the i-th symbol for the second transmission.

A correlation threshold is set, based on the requirements of system 100, the components used to build system 100, receiver 108, etc. and based on the time it will take to search the newly generated seed 500 with respect to all other already saved seeds 500. This threshold can be 0 dB, −3 dB, −6 dB, −9 dB, −12, dB, or any other value; the smaller this value, the lower the threshold cross-correlation value, and therefore the lower the likelihood that transmissions encoded with any of the candidate Gold codes in the set will have measurable interference with each other. A compromise threshold can be selected based on time available to check the codes if desired.

The newly generated seed 500 is then added to a set of saved seeds 500 (the "saved set") if the correlation between the Gold codes created using the newly generated seed 500 and all other such Gold codes in the saved set is less than or equal to the selected threshold. This process is repeated until the desired number of seeds 500 and corresponding Gold codes is present in the saved set.

Unique Word Generation

In a similar fashion, the header codes 411 can be selected by calculating the cross correlations between the headers of all likely DVBS-2 encoded transmission modes that will be used in the transmission network For example some transmission modes are as follows: QPSK: ½, ⅗, ⅔, ¾, ⅘, ⅚, ⅞, and 9/10; 8-PSK: ⅗, ⅔, ¾, ⅚, ⅞, and 9/10; both with and without pilot symbols. These modes are then scrambled using candidate header codes, and then identifying those header codes 411 (UWs) that provide scrambled header with cross-correlations below a predetermined threshold value. A subset of these codes 411 can be reserved for specific portions of the system 100, e.g., used for the Boot Strap Loader (BSL), or for other purposes.

Once all of the best seeds 500 and header codes 411 are generated as described above, each seed 500 is paired with a header code 411 to create an AMC code, which is then given a number for reference. This process continues until enough AMC codes are generated for the system 100. The pairing of seeds 500 and header codes 411 can be done by ranking each of the seeds 500 and header codes 411 individually, and then pairing the "best" seed 500 with the "best" header code 411, etc. Other methods, such as random pairing, selecting a subset of the ranked seeds 500, and header codes 411 for specific pairing and randomly pairing the remainder, or other methods.

Cross-Correlation Comparison Method for Header Code (Unique Word)

To generate a header code 411, the default sequence from DVB-S2 may be used in the saved set. A random header code 411 (UW) is generated and used to scramble the likely headers for a given non-backward compatible transmission mode. The correlation between different headers scrambled using the newly generated candidate header codes 411 and those already generated is determined by $$\frac{1}{90} \max_{j=-89}^{89} \left| \sum_{i=0}^{89} a_{i+j} b_i^* \right|$$

where $a_j=0$ if $i>0$

Where $a_{i+j}$ is the (i+j)-th bit of the first header and by it the j-th bit of the second header.

The maximum cross-correlation for all likely headers scrambled using all the candidate header codes is then determined. A correlation threshold is set, based on the requirements of system 100, the components used to build system 100, receiver 108, etc. and based on the time it will take to search the newly generated header code 411 with respect to all other already saved header codes 411. This threshold can be 0 dB, −3 dB, −6 dB, −9 dB, −12, dB, or any other value; the smaller this value, the lower the threshold cross-correlation value, and therefore the lower the likelihood that transmissions encoded with any of the candidate header codes in the set will have measurable interference with each other.

The newly generated header code 411 is then added to a set of saved header codes 411 (the "saved set" if the correlation between the newly generated header code 411 and all other codes 411 in the saved set (from 4) is less than or equal to the selected threshold. This process is repeated until the desired number of header codes 411 is present in the saved set.

Choosing the Best Unique Words and Gold Codes

Once the saved sets of seeds 500 and header codes 411 are determined, those codes that have the least amount of cross-correlation with other codes can be found. By sequencing through the saved sets, e.g., by starting with the default sequence 0 in the header code 411 saved set, or by starting with a default seed value of 1 in the seed 500 saved set, a new threshold can be set and each set can be sequentially tested to find a subset of the seeds 500/header codes 411 that have a lower threshold than set above (when determining the initial saved sets of seeds 500/header codes 411). By varying the correlation threshold, a greater or smaller number of "best" seeds 500 and header codes 411 can be determined for those areas that are thought to be critical in terms of co-channel interference.

The remainder of the seeds 500/header codes 411 can then be rank ordered by computing the correlation between each of the remaining seeds 500/header codes 411 against the "best" seeds 500/header codes 411, and sorting these by correlation values.

The seeds 500/header codes are then ordered from "best" to "worst" (but still acceptable because it was lower than the defined threshold) and then paired up to create an AMC code. Alternatively, since all seeds and codes within the sets have acceptable performance, they may be paired at random if desired.

Code Testing

Figure 6:
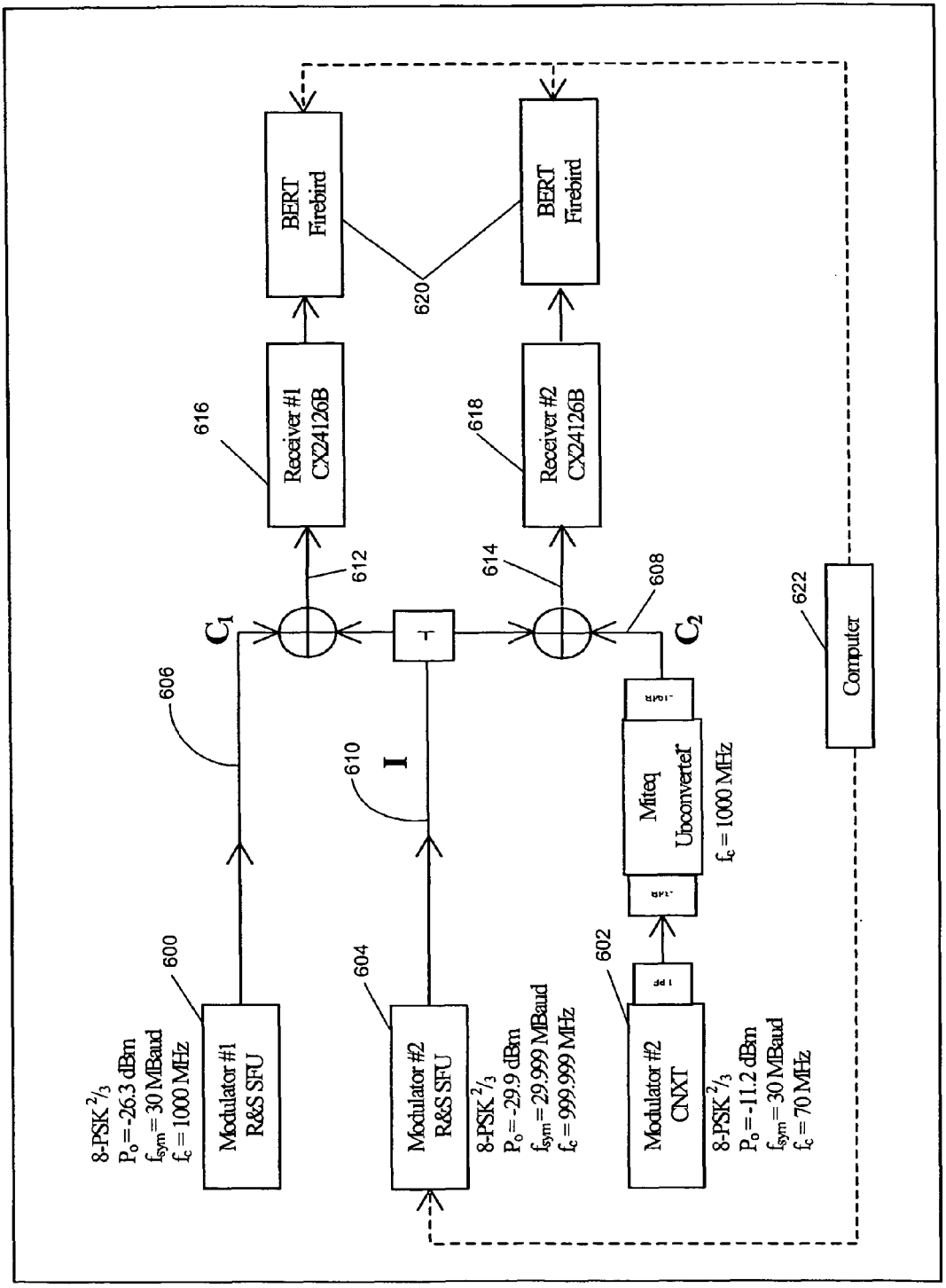
FIG. 6 illustrates a test setup used on the codes generated using the present invention.

FIG. 6 illustrates a test setup used on the codes generated using the present invention.

Modulators 600, 602, and 604 were used to generate signals which would either be a wanted signal, $C_1$ and $C_2$, or an interfering signal, I. Modulators 600-604 all can generate a signal with a specific seed 500 and header code 411, such that a known seed 500 and header code 411 is used to scramble the signal. Although shown as specific models of modulators 600-604, any modulator can be used within the scope of the present invention. Modulator 600 generates signal 606, which has a PL header 400 scrambled with a first header code 411, and a payload 403 which was scrambled using a first seed 500. Similarly, modulator 602 generates signal 608, and modulator 604 generates signal 610.

Signals 606 and 608 are channels of interest. Signal 610 is an interfering channel with channels 606 and 608. If channels 606 and 608 are scrambled with the same seeds 500 and header code 411, and channel 610 is scrambled with a different seed 500 and header code 411, then co-channel interference can be determined between channels 606 and 610, as well as between channels 608 and 610. The two Carrier-to-Interference Ratios ($C_1$/I and $C_2$/I) in this configuration were measured to be 8 dB for both signal 612 and signal 614, which is the C/I ratio at a typical receiver 108 selected for this illustrative test. The specific C/I ratio tested will depend on the characteristics of the transmission network. Although two signals 606 and 608 are shown, any number of desired signals 606 and 608 can be used without departing from the scope of the present invention.

The combined signals 606 and 610 result in signal 612, whereas the combined signals 610 and 608 result in signal 614. Signal 612 is input to receiver 616, and signal 614 is input to receiver 618. These receivers 616-618 demodulate and then decode each transmission and then pass their signals to a Bit Error Rate Test (BERT) box 620, which is coupled to a computer 622. The computer 622 controls the modulator 604 to change the signal 610 to a new seed 500 and header code 411 to check interference with signals 606 and 608. Additive White Gaussian Noise (AWGN) can be added to the test setup if desired. Any receivers 616-618 that can detect the signals 612 and 614, or any type of computer 622 can be used without departing from the scope of the present invention.

The computer 622 allows all possible pairs of seed 500/header code 411 to be tested against all other pairs of seed 500/header code 411 in rapid fashion. These tests can be done manually if desired. Each signal 610 is injected for a given amount of time to determine whether any errors will be seen at box 620 and recorded by computer 622. It is important that during the test period, there occur several instances of alignment of the header and pilot symbol blocks for both signals 606 and 610, and 608 and 610. The symbol rates of the modulators are offset slightly from each other so that the header and pilot symbol blocks for one transmission will drift in time relative to the other. In setup in FIG. 6, this is accomplished by offsetting both the symbol rate and frequency for the interfering and wanted signals. In FIG. 6, this is a baud rate of 29.999 Megabaud and an RF frequency of 999.999 MHz for the interfering signal 610, and a baud rate of 30 Megabaud and an RF frequency of 1000 MHz for both wanted signals 606 and 608. The upconverter can be placed at different frequencies, e.g., 930 MHz or 1070 MHz, depending on the requirements of the system or the desires of the user. Additional means of locking the internal clocks for the three modulators and the frequency upconverter, if needed, is not shown in FIG. 6 but may also be provided.

When the signal representing interference 610 and the desired signal 606 use the same seed 500/header code 411, errors are seen, because the signals interfere with each other. When an interfering signal 610 is tested against a signal 606 where signals 610 and 606 use different seeds 500 and/or different header codes 411, errors may or may not be seen. However, with the seeds 500 and header codes 411 selected against a given threshold, errors are not expected, and were not seen, when different pairs of seeds 500/header codes 411 are used.

Flowchart

Figure 7:
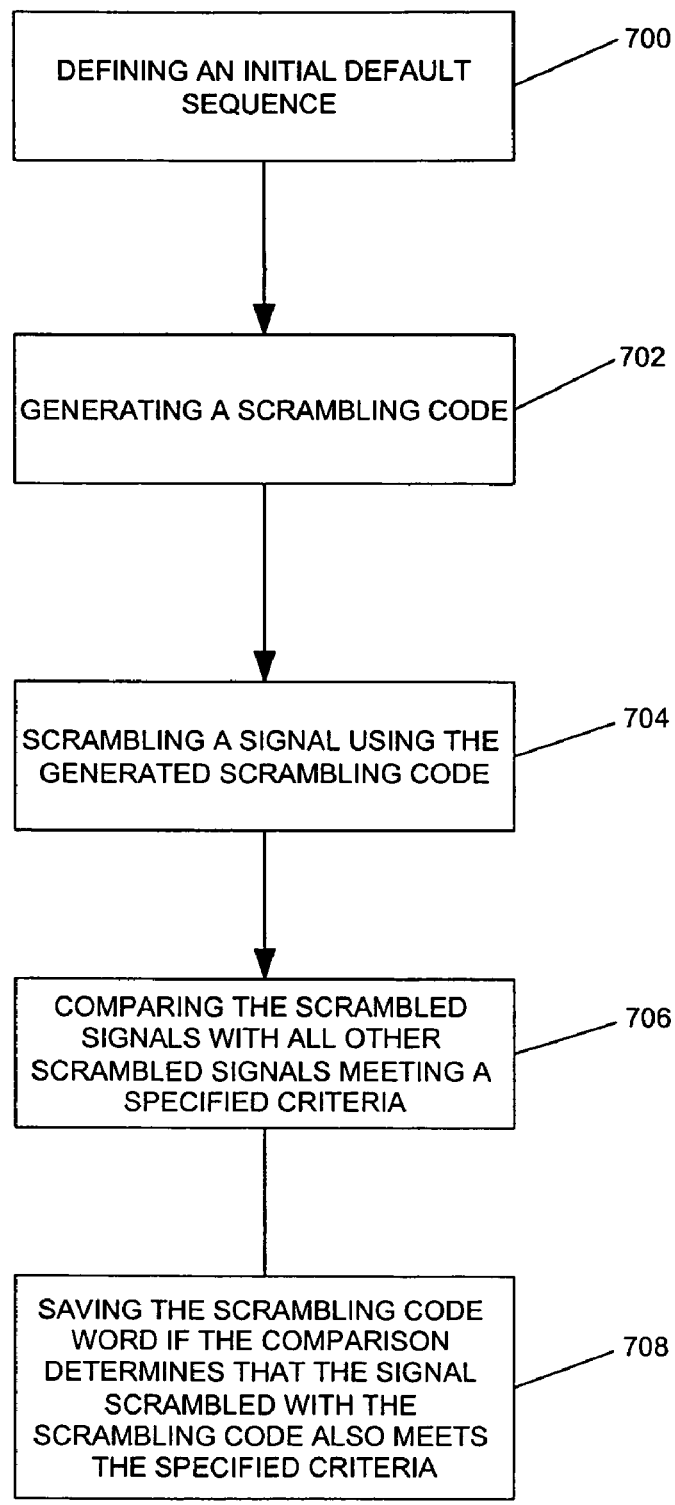
FIG. 7 is a flowchart showing the steps of the present invention.

FIG. 7 is a flowchart showing the steps of the present invention.

Box 700 represents defining at least one initial default sequence.

Box 702 represents generating a scrambling code.

Box 704 represents scrambling a signal using the generated scrambling code.

Box 706 represents comparing the scrambled signals with all other scrambled signals meeting a specified criterion.

Box 708 represents saving the scrambling code word if the comparison determines that the signal scrambled with the scrambling code also meets the specified criterion.

CONCLUSION

In summary, the present invention comprises methods and apparatuses for determining scrambling codes for minimizing co-channel interference in a communication system. A method in accordance with the present invention comprises defining an initial default sequence, generating a scrambling code, scrambling a signal using the generated scrambling code, comparing the scrambled signal with all other scrambled signals meeting a specified criterion, and saving the scrambling code word if the comparison determines that the signal scrambled with the scrambling code also meets the specified criterion.

The method optionally also includes the scrambling code being applied to a header of the signal or to a payload portion of the signal, the scrambling code being a Gold code, and the specified criterion being a correlation threshold set between 0 dB and −12 dB, or lower.

The method can also include setting a second criterion which is more stringent than the specified criterion, and comparing the saved scrambling codes to determine a rank order of the saved scrambling codes.

An alternate method for determining scrambling codes for minimizing co-channel interference in a communication system comprises defining an initial seed, generating a seeded scrambling code from the seed, scrambling a payload portion of a signal using the generated seeded scrambling code, comparing the scrambled payload portion of the signal with all other scrambled payload portions meeting a first specified criterion, saving the seeded scrambling code word if the comparison determines that the payload portion of the signal scrambled with the seeded scrambling code also meets the first specified criterion, defining an initial default sequence, generating a unique word (UW) scrambling code, scrambling a header portion of the signal using the generated UW scrambling code, comparing the scrambled header portion of the signal with all other scrambled header portions meeting a second specified criterion, saving the UW scrambling code word if the comparison determines that the signal scrambled with the scrambling code also meets the second specified criterion, and pairing the saved UW scrambling codes with the saved seeded scrambling codes.

The alternate method optionally further includes the first or second specified criterion being a correlation threshold set between 0 dB and −12 dB, or lower value, and a number of saved UW scrambling codes and a number of seeded scrambling codes being determined based on a number of channels within the communication system.

The alternate method can also include transmitting information associated with the seeded scrambling codes and the UW scrambling codes to a receiver within the communication system.

The present invention also comprises a computer-readable medium bearing instructions for minimizing co-channel interference in a communication system, said instruction, being arranged, upon execution, to cause one or more processors to perform the methods above.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A method for determining scrambling codes for reducing co-channel interference in a communication system, comprising:

defining at least one initial default sequence;

generating a scrambling code with a scrambling code generator;

scrambling a first signal in a plurality of signals with a scrambler apparatus using the generated scrambling code;

comparing the scrambled first signal with a remainder of the signals in the plurality of scrambled signals meeting a specified co-channel interference criterion with a computer device; and saving the scrambling code word in the computer device if the comparison determines that the first signal scrambled with the scrambling code also meets the specified co-channel interference criterion, wherein the specified co-channel interference criterion comprises at least reducing co-channel interference between the first signal and the remainder of the signals in the plurality of scrambled signals.

2. The method of claim 1, wherein the scrambling code is applied to a header of the first signal.

3. The method of claim 1, wherein the scrambling code is applied to a payload portion of the first signal.

4. The method of claim 3, wherein the scrambling code is a Gold code.

5. The method of claim 1, wherein the specified co-channel interference criterion is a correlation threshold.

6. The method of claim 5, wherein the correlation threshold is set between 0 dB and −12 dB.

7. The method of claim 6, further comprising:
setting a second co-channel interference criterion which is lower than the specified co-channel interference criterion; and
comparing the saved scrambling codes to determine a rank order of the saved scrambling codes.

8. A method for determining scrambling codes for reducing co-channel interference in a communication system, comprising:
defining an initial seed;
generating a seeded scrambling code from the seed using a scrambling code generator;
scrambling a payload portion of a first signal of a plurality of signals with a scrambler apparatus using the generated seeded scrambling code;
comparing the scrambled payload portion of the first signal with a remainder of the signals in the plurality of signals having scrambled payload portions meeting a first specified criterion with a computer device;
saving the seeded scrambling code word in the computer device if the comparison determines that the payload portion of the first signal scrambled with the seeded scrambling code also meets the first specified criterion, wherein the first specified co-channel interference criterion comprises at least reducing co-channel interference between the first signal and the remainder of the signals in the plurality of scrambled signals;
generating a unique word (UW) scrambling code from an initial default sequence at the scrambling code generator;
scrambling a header portion of the first signal with the scrambler apparatus using the generated UW scrambling code;
comparing the scrambled header portion of the first signal with a remainder of the signals in the plurality of signals having scrambled header portions meeting a second specified criterion using a computer device;
saving the UW scrambling code word at the computer device if the comparison determines that the first signal scrambled with the scrambling code also meets the second specified criterion; and
pairing the saved UW scrambling codes with the saved seeded scrambling codes at the computer device.

9. The method of claim 8, wherein the first specified criterion is a correlation threshold.

10. The method of claim 9, wherein the correlation threshold is set between 0 dB and −12 dB.

11. The method of claim 9, wherein the correlation threshold is set below −12 dB.

12. The method of claim 8, wherein the second specified criterion is a correlation threshold.

13. The method of claim 12, wherein the correlation threshold is set between 0 dB and −12 dB.

14. The method of claim 12, wherein the correlation threshold is set below −12 dB.

15. The method of claim 8, wherein a number of saved UW scrambling codes and a number of seeded scrambling codes is determined based on a number of channels within the communication system.

16. The method of claim 8, further comprising the step of:
transmitting information associated with the seeded scrambling codes and the UW scrambling codes to a receiver within the communication system.

17. A non-transitory computer-readable medium bearing instructions for minimizing co-channel interference in a communication system, said instruction, being arranged, upon execution, to cause one or more processors to perform the method of claim 1.

18. A non-transitory computer-readable medium bearing instructions for minimizing co-channel interference in a communication system, said instruction, being arranged, upon execution, to cause one or more processors to perform the method of claim 8.

19. A method for testing cross-correlation between two scrambling codes, comprising:
generating at least one wanted signal with a modulator, the wanted signal comprising a wanted header and a wanted payload, wherein the wanted payload is scrambled with a scrambler using a first seed and the wanted header is scrambled with the scrambler using a first header code;
generating an interfering signal with a modulator comprising an header and a payload, wherein the payload of the interfering signal is scrambled with the scrambler using a second seed and the header of the interfering signal is scrambled with the scrambler using a second header code;
comparing the at least one wanted signal with the interfering signal with a computer device;
determining the cross-correlation between the at least one wanted signal and the interfering signal based on the comparing of the at least one wanted signal with the interfering signal with the computer device; and
determining with the computer device if the cross-correlation between the at least one wanted signal and the interfering signal meets a specified criterion, wherein the specified criterion comprises at least reducing cross-correlation between the at least one wanted signal and the interfering signal.

* * * * *